United States Patent [19]

Hopper et al.

[11] Patent Number: 4,714,742

[45] Date of Patent: Dec. 22, 1987

[54] CYANAMIDE DERIVATIVES AS VULCANIZATION RATE MODIFIERS

[75] Inventors: Roger J. Hopper; Carl R. Parks, both of Akron, Ohio

[73] Assignee: The Goodyear Tire & Rubber Company, Akron, Ohio

[21] Appl. No.: 920,531

[22] Filed: Oct. 20, 1986

[51] Int. Cl.$^4$ .................... C08C 19/20; C08C 19/22
[52] U.S. Cl. .................... 525/346; 525/332.7; 525/332.9
[58] Field of Search ............ 525/346, 374, 377, 332.7, 525/332.9

[56] References Cited

FOREIGN PATENT DOCUMENTS 870415 10/1981 U.S.S.R. .

*Primary Examiner*—Christopher Henderson
*Attorney, Agent, or Firm*—D. O. Nickey

[57] ABSTRACT

There are disclosed cyanamide derivatives as vulcanization rate modifiers which when added to customary cure packages, accelerate the rate of vulcanization and result in vulcanizates having improved characteristics and age resistance.

7 Claims, No Drawings

CYANAMIDE DERIVATIVES AS VULCANIZATION RATE MODIFIERS

TECHNICAL FIELD

This invention relates to the sulfur vulcanization of rubber, and to the protection of rubber against ozone. More particularly, the invention relates to rubbery compositions containing N,N-disubstituted cyanamides, and to processes for vulcanizing such compositions.

BACKGROUND ART

It is well known in the rubber industry that preferred accelerators are those which, when mixed into vulcanizable rubber compositions and heated, exhibit an induction period (scorch delay) prior to the onset of vulcanization. It is also preferred that vulcanization proceed rapidly once the induction period has ended. Such a combination of characteristics has the practical benefits of maximum processing safety and shorter cure cycles. The present invention provides novel accelerator systems which meet these criteria.

It is also well known in the rubber industry that unsaturated rubbers are subject to attack by ozone, resulting in surface cracks which can penetrate to the point of failure of the rubber article. Common practice is to add chemical antiozonants, usually p-phenylenediamine derivatives to the rubber to help resist ozone attack. Such phenylenediamines, however, cause severe discoloration and are thus unsuitable for white or light colored rubbers. The compounds of the present invention can be used to provide ozone protection without causing the usual discoloration.

The cyanamides useful in the compositions of the present invention may be synthesized by adaptations of prior art procedures, wherein cyanamide, $H_2N-C\equiv N$, is reacted with two molar equivalents of an organohalide, RX, to produce an N,N-disubstituted cyanamide, $R_2NCN$. Examples of N,N-disubstituted cyanamide production can be found in A. Jonczyk, Z. Ochal, and M. Makosza, Synthesis, 1978, p. 882. and U.S. Pat. No. 4,206,141 (June 3, 1980).

DISCLOSURE OF THE INVENTION

There is disclosed a sulfur vulcanizable composition comprising a sulfur vulcanizable rubber and at least one compound having the general structural formula:

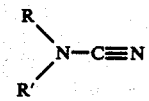

(I)

wherein R and R' may be the same or different radicals selected from the group comprised of alkyl radicals of 1-20 carbon atoms, cycloalkyl radicals of 5-20 carbon atoms, aralkyl radicals of 7-20 carbon atoms and alkenyl radicals of 3-20 carbon atoms wherein the alkenyl function is at the two position or greater.

Preferably R and R' are equivalent and are selected from primary alkyl radicals of 2-20 carbon atoms, allylic radicals of 3-20 carbon atoms or benzylic radicals of 7-20 carbon atoms.

Representative of the compounds of structural formula I which are useful in the instant invention include N,N-di(1-propyl) cyanamide, N,N-di(1-hexyl) cyanamide, N,N-di(1-octyl) cyanamide, N,N-di(1-decyl) cyanamide, N,N-di(1-octadecyl) cyanamide, N,N-dibenzyl cyanamide, N,N-diallyl cyanamide, N-(1-hexyl)-N-(1-decyl) cyanamide, and N,N-di(1-butyl) cyanamide.

The accelerators of this invention may be incorporated into rubber along with other conventional ingredients by standard mixing techniques. While the amount used depends on the specific formulation, and on the vulcanization characteristics, vulcanizate properties, and ozone resistance desired, a range of 0.3–10 parts per hundred parts of rubber is generally effective. A range of 0.8–6.0 parts per hundred parts of rubber is preferred.

The cyanamides of the present invention can be used with any sulfur vulcanizable rubber including natural and synthetic rubbers and mixtures thereof. Synthetic rubbers include homopolymers and copolymers of dienes, both conjugated and nonconjugated, e.g., 1,3-dienes such as 1,3-butadiene and isoprene. Examples of such synthetic rubbers include neoprene (polychloroprene), cis-1,4-polybutadiene, cis-1,4-polyisoprene, butyl rubber and copolymers of 1,3-butadiene or isoprene with monomers such as styrene, acrylonitrile, isobutylene and methyl methacrylate. The accelerators of this invention can also be used with ethylene-propylene terpolymers (EPDM) as well as polypentenamers derived from ring opening polymerization of cyclopentene.

Conventional additives, known in the rubber industry, are suitable for use in conjunction with the accelerators of the present invention include fillers (e.g. carbon black and silica), metal oxides (e.g. titanium dioxide, zinc oxide), fatty acids (e.g. stearic acid), phenolic or amine-based antidegradants, and elemental sulfur or an organic sulfur donor (e.g. amine disulfides, alkylphenol disulfides).

The cyanamides of this invention are preferably used in combination with other accelerators to increase cure rates with minimal adverse effects on the induction period prior to cure. Suitable accelerators include benzothiazole sulfenamides, mercaptobenzothiazole disulfide, aminodithiobenzothiazoles, thiocarbamyl sulfenamides, tetraalkylthiuram disulfides, tetraalkylthiuram monosulfides, diarylguanidines, aldehyde-amine condensation products, and organophosphorous sulfides [e.g. O,O'-diisopropylthiophosphoryl-di(and tri-)sulfides].

The effects of the cyanamide derivatives in vulcanizable rubber compositions were evaluated by the following procedures. Mooney Scorch tests were performed using the large rotor as described in ASTM D1646-61, continuously recording viscosity versus time. The minutes to a 5 point rise above the minimum viscosity was taken as a measure of the induction period prior to vulcanization (i.e. scorch inhibition). Larger values indicate greater resistance to scorch or premature vulcanization. Cure characteristics were determined on an oscillating disk rheometer, essentially according to ASTM D-2084-71-T. Pertinent data reported are $t_{s2}$, the time to a 2 in lb. rise above the minimum; $M_H-M_L$, the maximum torque after curing minus the minimum torque: $t'_c (90)$, the time required to reach 90% of full torque development. The value, $t_{s2}$, is taken as a measure of scorch delay, and $M_H-M_L$ as a measure of the relative state of cure, while $t'_c (90)$ is considered to approximate the optimum cure time. Tensile strength, elongation, and stress at 300% elongation were obtained according to standard procedures wherein dumbbell samples were cut from vulcanized sheets and tested in a conventional tensile tester. Values reported are: UTS, the ultimate tensile strength; UE, the ultimate elongation and 300% M, the stress at 300% elongation.

conjunction with representative cyanamide derivatives of the invention.

TABLE I

CYANAMIDES AS DELAYED ACTION ACTIVATORS AND ANTIOZONANTS IN WHITE SBR STOCK

| | Test Stock | | | | | | | |
|---|---|---|---|---|---|---|---|---|
| | 1 | 2 | 3 | 4 | 5 | 6 | 7 | 8 |
| Variable Components (PHR) | | | | | | | | |
| Tetramethylthiuram disulfide (TMTD) | — | — | — | — | 0.15 | 0.15 | 0.15 | 0.15 |
| N,N—Di(1-hexyl)-cyanamide | — | 2.35 | — | — | — | 2.35 | — | — |
| N,N—Di(1-octyl)-cyanamide | — | — | 3.00 | — | — | — | 3.00 | — |
| N,N—Di(1-decyl)-cyanamide | — | — | — | 3.60 | — | — | — | 3.60 |
| N—Phenyl-N'—(1,3-dimethyl-butyl-p-phenylenediamine | 3.00 | — | — | — | — | — | — | — |
| Monsanto Rheometer (149° C., 3°Arc, 100 cpm): | | | | | | | | |
| $t_{s2}$, min | 6.8 | 10.5 | 11.6 | 11.7 | 6.2 | 6.5 | 6.7 | 6.8 |
| $t'_c$ (90), min | 27.5 | 26.5 | 27.5 | 29.0 | 24.0 | 16.0 | 16.5 | 16.5 |
| $M_H$—$M_L$ in. lb | 54.1 | 60.7 | 58.7 | 58.5 | 62.5 | 70.8 | 67.8 | 64.2 |
| Physical Properties (Cured at 149° C.): | | | | | | | | |
| Cure Time, min. | 30 | 30 | 30 | 35 | 30 | | | |
| UTS, psi | 700 | 775 | 2025 | 1900 | 1000 | | | |
| UE, % | 520 | 500 | 640 | 650 | 550 | | | |
| 300% M, psi | 375 | 350 | 325 | 325 | 400 | | | |
| Static Ozone (25% extension, 50 pphm, 40° C.):[a] | | | | | | | | |
| Status after 72 h | 2/7 | 4/7 | 4/6 | 4/7 | Fail | | | |
| Status after 96 h | 3/9 | Fail | 4/8 | 4/9 | Fail | | | |
| Dynamic Ozone (25% extension, 50 pphm, 40° C.): | | | | | | | | |
| Status after 72 h | 4/2 | 4/4 | 4/4 | 4/4 | 4/9 | | | |
| Status after 96 h | 4/2 | 4/6 | 4/6 | 4/6 | Fail | | | |
| Common Components (PHR): | | | | | | | | |
| 100.0 SBR 1502 containing 23.5% styrene; 30.0 TiO$_2$; 30.0 mercaptosilane modified silica; 10.0 zinc oxide; 2.0 stearic acid; 1.0 2-(morpholinodithio)-benzothiazole; 2.0 sulfur | | | | | | | | |

[a]ozone rating = crack density (0 to 4)/crack severity (0 to 10).

Ozone testing was carried out according to ASTM D-1149-86. For static tests, specimen A was used. For dynamic tests, the specimen was a 0.5 by 4 by 0.1 inch rectangular strip.

BEST MODE

The test stocks found in Tables I–V, describe the use of the cyanamides of this invention in rubber and are intended to illustrate, but not limit the practice of the present invention.

The test stocks were prepared by typical procedures wherein the rubbers, fillers and zinc oxide were first mixed in an internal mixer (Banbury) to produce masterbatches. The remaining ingredients were then mixed into the masterbatches on a two-roll mill.

The cure activator-antiozonant properties of some representative cyanamides were evaluated in a white SBR stock and the results are summarized in Table I, Test Stocks 1–8. Test Stock 1 contains a conventional phenylenediamine activator-antiozonant, while Test Stock 5 is a control with the conventional activator, tetramethyl-thiuram disulfide (TMTD), which has no antiozonant properties. Test stocks 6–8 use TMTD in From the data presented in Table I, it is evident that relative to Stock 1, the cyanamide containing Test Stocks 2 and 3 were less scorchy (ts$_2$) yet cured in equal or less time [t'c (90)]. Test Stock 4 was slightly slower curing yet possessed adequate processing safety. The conventionally activated Test Stock 5 was the fastest curing, but only at the expense of scorch delay. The cyanamide containing stocks showed ozone resistance superior to Test Stock 5, but inferior to Test Stock 1. However, Test Stock 1 had acquired a purple coloration, while the cyanamide containing stocks remained essentially white. Test Stocks 6–8 of Table I illustrate that the use of the cyanamides of this invention in conjunction with TMTD can produce substantially shorter cure times with no sacrifice in scorch delay.

The results in Tables II and III further illustrate the delayed action activator characteristics of the cyanamides in 2-(morpholinodithio)-benzothiazole accelerated white SBR rubber compounds. Table II uses 2-(morpholinodithio)-benzothiazole in all test stocks while Table III uses TMTD and 2-(morpholinodithio)-benzothiazole in all test stocks. The addition of the cyanamides results in substantially shortened cure times with little or no adverse effect on scorch delay.

TABLE II

EFFECTS OF N,N DISUBSTITUTED CYANAMIDES IN 2(MORPHOLINODITHIO)-BENZOTHIAZOLE ACCELERATED WHITE SBR STOCK

| | Test Stock | | | | |
|---|---|---|---|---|---|
| | 1 | 2 | 3 | 4 | 5 |
| Variable Cyanamides (PHR) | | | | | |
| N,N—di(1-octyl)-cyanamide | — | 3.0 | — | — | — |
| N,N—dibenzyl-cyanamide | — | — | 2.5 | 4.2 | — |
| N,N—diallyl-cyanamide | — | — | — | — | 2.3 |
| Mooney Scorch (132° C., Large Rotor): | | | | | |

TABLE II-continued

EFFECTS OF N,N DISUBSTITUTED CYANAMIDES IN 2(MORPHOLINODITHIO)-BENZOTHIAZOLE ACCELERATED WHITE SBR STOCK

| | Test Stock | | | | |
|---|---|---|---|---|---|
| | 1 | 2 | 3 | 4 | 5 |
| 5 pt. rise, min. | 26.5 | 22.5 | 30.5 | 31.3 | 25.9 |
| Monsanto Rheometer (150° C., 3°Arc, 100 cpm): | | | | | |
| $t_{s2}$, min. | 12.5 | 11.0 | 14.5 | 15.2 | 12.0 |
| $t'_c$ (90), min. | 46.0 | 26.5 | 32.5 | 33.0 | 27.5 |
| $M_H$—$M_L$, in. lb. | 43.0 | 54.3 | 55.8 | 62.0 | 60.6 |

Common Components (PHR):
100.0 SBR 1502 (23.5% styrene); 30.0 TiO$_2$; 30.0 mercaptosilane modified silica; 5.0 zinc oxide; 2.0 stearic acid; 2.0 sulfur; 1.0 2-(morpholinodithio)-benzothiazole

TABLE III

EFFECTS OF N,N—DISUBSTITUTED CYANAMIDES IN 2-(MORPHOLINODITHIO)-BENZOTHIAZOLE/TMTD ACCELERATED WHITE SBR STOCK

| | Test Stock | | | | | | |
|---|---|---|---|---|---|---|---|
| | 1 | 2 | 3 | 4 | 5 | 6 | 7 |
| Variable Cyanamides (PHR) | | | | | | | |
| N,N—di(1-octyl)-cyanamide | — | 1.0 | 3.0 | — | — | — | — |
| N,N—dibenzyl-cyanamide | — | — | — | 2.5 | 4.2 | — | — |
| N,N—diallyl-cyanamide | — | — | — | — | — | 1.4 | 2.3 |
| Mooney Scorch (132° C., Large Rotor): | | | | | | | |
| 5 pt. rise, min. | 11.9 | 12.2 | 13.8 | 14.4 | 15.2 | 14.3 | 14.6 |
| Monsanto Rheometer (150° C., 3°Arc, 100 cpm): | | | | | | | |
| $t_{s2}$, min. | 6.2 | 6.7 | 6.7 | 7.2 | 7.5 | 7.0 | 7.0 |
| $t'_c$ (90), min. | 27.5 | 17.0 | 16.0 | 21.5 | 23.0 | 20.2 | 19.5 |
| $M_H$—$M_L$, in. lb. | 62.7 | 67.0 | 63.7 | 67.1 | 70.6 | 67.8 | 69.0 |

Common Components (PHR):
100.0 SBR 1502; 30.0 TiO$_2$; 30.0 mercaptosilane modified silica; 5.0 zinc oxide; 2.0 stearic acid; 2.0 sulfur; 1.0 2-(morpholinodithio)-benzothiazole disulfide; 0.2 TMTD The use of cyanamide derivatives in carbon black reinforced rubber stocks was investigated. From Table IV, it is evident that as activators for 2-(morpholinodithio)-benzothiazole in a black filled SBR stock, the cyanamides of this invention, when used at the proper level, produce better scorch resistance and shorter cure times than the conventional activator TMTD.

TABLE IV

EFFECTS OF N,N—DISUBSTITUTED CYANAMIDES IN SBR BLACK STOCK

| | Test Stock | | | | | | | |
|---|---|---|---|---|---|---|---|---|
| | 1 | 2 | 3 | 4 | 5 | 6 | 7 | 8 |
| Variable Components (PHR) | | | | | | | | |
| TMTD | — | 0.2 | — | — | — | — | — | — |
| N,N—di(1-octyl)-cyanamide | — | — | 1.0 | 3.0 | — | — | — | — |
| N,N—dibenzyl-cyanamide | — | — | — | — | 2.5 | 4.2 | — | — |
| N,N—diallyl-cyanamide | — | — | — | — | — | — | 2.3 | 4.6 |
| Mooney Scorch (132° C., Large Rotor): | | | | | | | | |
| 5 pt rise, min. | 22.5 | 13.8 | 17.3 | 14.3 | 17.6 | 16.0 | 14.4 | 12.0 |
| Monsanto Rheometer (150° C., 3°Arc, 100 cpm): | | | | | | | | |
| $t_{s2}$, min. | 9.7 | 6.4 | 7.6 | 6.6 | 7.8 | 6.7 | 6.1 | 4.8 |
| $t'_c$ (90), min. | 38.0 | 22.0 | 24.0 | 19.0 | 21.7 | 17.0 | 16.5 | 13.6 |
| $M_H$—$M_L$, in. lb. | 70.6 | 89.1 | 77.6 | 74.3 | 69.3 | 74.4 | 72.8 | 68.7 |

Common Components (PHR):
100.0 SBR-1502; 60.0 N—760 Black; 5.0 zinc oxide; 2.0 stearic acid; 2.0 sulfur; 1.0 2-(morpholinodithio)-benzothiazole.

The data summarized in Table V illustrates the effect of N,N-diallyl cyanamide on a sulfenamide accelerated, black-filled styrene-butadiene rubber/polybutadiene rubber blend. As compared to TMTD, the cyanamide provided better scorch protection and a shorter cure time.

TABLE V

EFFECT OF DIALLYL CYANAMIDE IN SULFENAMIDE ACCELERATED, BLACK FILLED SBR/BR BLEND

| | Test Stock | | |
|---|---|---|---|
| | 1 | 2 | 3 |
| Variable Components (PHR) | | | |
| TMTD | — | 0.15 | — |
| N,N—diallyl-cyanamide | — | — | 2.00 |
| Mooney Scorch (132° C., Large Rotor): | | | |
| 5 pt. rise, min. | 22.8 | 16.8 | 19.0 |
| Monsanto Rheometer (150° C., 3° Arc, 100 cpm): | | | |
| $t_{s2}$, min. | 11.0 | 9.2 | 9.5 |

TABLE V-continued

EFFECT OF DIALLYL CYANAMIDE IN SULFENAMIDE ACCELERATED, BLACK FILLED SBR/BR BLEND

|  | Test Stock | | |
|---|---|---|---|
|  | 1 | 2 | 3 |
| t'$_c$ (90), min. | 31.0 | 22.0 | 20.8 |
| M$_H$—M$_L$, in lb. | 40.7 | 42.9 | 40.2 |
| Physical Properties (Cured t'$_c$ (90) min. at 150° C.): | | | |
| UTS, psi | 3050 | 2450 | 3000 |
| UE, % | 690 | 530 | 700 |
| 300% M, psi | 925 | 1050 | 850 |
| Common Components (PHR): | | | |
| 86.25 SBR-1712, 30.00 high cis-polybutadiene, 7.50 aromatic oil, 3.00 paraffin wax, 65.00 N-299 carbon black, 2.00 stearic acid, 1.00 amine antioxidant, 3.00 zinc oxide, 1.70 sulfur, 1.10 N—(t-butyl)-2-benzothiazole sulfenamide. | | | |

Industrial Applicability

Through the use of the compounds of the instant invention, the rubber compounder is able to increase the rate of vulcanization without unduly shortening the viable working time of the compound. In addition, said compounds can unexpectedly impart ozone resistance to the finished vulcanizates without causing discoloration. Such beneficial properties are unexpected and their usefulness would be readily apparent to those skilled in the art.

While certain representative embodiments and details have been shown for the purpose of illustrating the invention, it will be apparent to those skilled in this art that various changes and modifications may be made therein without departing from the scope of the invention.

What is claimed is:

1. A sulfur vulcanizable composition comprising a sulfur vulcanizable rubber and at least one compound having the general structural formula:

wherein R and R' may be the same or different radicals selected from the group comprised of alkyl radicals of 1–20 carbon atoms, aralkyl radicals of 7–20 carbon atoms and alkenyl radicals of 3–20 carbon atoms wherein the alkenyl function is at the two position or greater.

2. The sulfur vulcanizable composition according to claim 1 wherein the compound is selected from the group consisting of: N,N-di(1-hexyl) cyanamide; N,N-di(1-propyl) cyanamide: N,N-di(1-octyl) cyanamide: N,N-di(1-decyl) cyanamide: N,N-di(1-octadecyl) cyanamide: N,N-dibenzyl cyanamide: N,N-diallyl cyanamide: and N,N-di(1-butyl) cyanamide.

3. A process of preparing a rubbery vulcanizate comprising heating the sulfur vulcanizable rubber of claim 1 at a vulcanizing temperature.

4. The sulfur vulcanizable composition according to claim 1 wherein the compound is present in the composition at a concentration of from 0.3 to 10 parts per 100 parts of rubber.

5. The sulfur vulcanizable composition according to claim 1 wherein the compound is present in the composition at a concentration of from 0.8 to 6.0 parts per 100 parts of rubber.

6. A vulcanized rubber obtained by the process claimed in claim 3.

7. The sulfur vulcanizable composition according to claim 1 wherein the compound is N,N-di(1-butyl) cyanamide.

* * * * *